United States Patent
Bouvier et al.

[11] Patent Number: 5,961,594
[45] Date of Patent: Oct. 5, 1999

[54] REMOTE NODE MAINTENANCE AND MANAGEMENT METHOD AND SYSTEM IN COMMUNICATION NETWORKS USING MULTIPROTOCOL AGENTS

[75] Inventors: Francois Bouvier, Antibes; Jean-Marc Millet, Vence, both of France

[73] Assignee: International Business Machines Corporation, Armonk, N.Y.

[21] Appl. No.: 08/806,184

[22] Filed: Feb. 25, 1997

[30] Foreign Application Priority Data

Sep. 26, 1996 [EP] European Pat. Off. ............ 964 80 097

[51] Int. Cl.[6] ..................................................... G06F 13/00
[52] U.S. Cl. ........................... 709/223; 709/218; 709/246
[58] Field of Search ........................ 395/200.47, 200.48, 395/200.49, 200.68, 200.76; 709/217, 218, 219, 238, 246, 223; 714/10; 707/10, 4

[56] References Cited

U.S. PATENT DOCUMENTS

5,517,622  5/1996  Ivanoff et al. ...................... 395/200.13
5,742,762  4/1998  Scholl et al. ....................... 395/200.57

*Primary Examiner*—Lance Leonard-Barry, Esq.
*Assistant Examiner*—Jason D. Cardone
*Attorney, Agent, or Firm*—John J. Timar

[57] ABSTRACT

A system and method for remotely accessing communication network nodes and for monitoring each type of resource within such nodes in a fast, reliable and efficient manner. The system components are a web browser as user interface, a web server for generating and transmitting commands to the destination node using the Common Gateway Interface (CGI) of the web server and a dedicated multiprotocol agent hosted in each node communicating with the web server by means of an appropriate protocol.

24 Claims, 9 Drawing Sheets

REMOTE NODE MAINTENANCE AND MANAGEMENT METHOD AND SYSTEM IN COMMUNICATION NETWORKS USING MULTIPROTOCOL AGENTS

BACKGROUND OF THE INVENTION

1. Field of the Invention

The present invention relates to remote node maintenance and management in communication networks and more particularly, to a system and method for providing access to communication network nodes and for monitoring each type of resource within the network nodes in a fast, reliable and efficient manner.

2. Description of the Related Art

Network management is the art of managing communication networks. Almost everybody uses a communication network at one time or another without always being aware of it. Using an automatic teller machine is an example of using a communication network in daily life. A communication network provides means for transporting data, voice or video from one computer to another via a collection of devices, cables, circuits, etc. Linking computers through a network allows the sharing of computing power and information between users and thus increases efficiency and productivity. Significant and sometimes huge amounts of money are invested in communication networks by organizations and companies. The maintenance of large and complex networks is a considerable task and today, even on medium sized networks, the maintenance is computer assisted so as to be more cost effective. This automated assistance is known as "network management". This process collects data related to the network (manually or automatically), processes the data, and synthesizes it in a human readable form to facilitate network operations. More sophisticated systems analyze data and suggest or even implement solutions. Moreover, some systems are capable of generating reports and statistics.

Network management such as defined by the International Standards Organization (ISO) is divided into five functional areas:
1. fault management,
2. configuration management,
3. security management,
4. performance management,
5. accounting management.

Network management is in no way a monolithic process. It is a set of processes cooperating together.

A communication network is made of many pieces of hardware equipment and software programs. For any reason, some may be working wrong or not working at all. The fault management function deals with these failures. It consists in
1. discovering the problem,
2. isolating the problem, and
3. fixing the problem.

Discovering the problem can be by means of a telephone call from a user or by means of the faulty device itself reporting the failure if it is able to do it. When the faulty device is down, the neighbors within the network may report a loss of contact or something similar.

Isolating the problem consists in pinpointing the failing component (which may not be the component signalling the error). It is crucial to conduct investigations remotely (i.e. without resorting to travel).

Fixing the problem consists in executing the proper repair action. In present systems, a failing device is generally able to indicate the appropriate corrective action. The capability to download code remotely and to fix software problems constitutes a determinative advantage.

In networks, some devices have a critical function, nodes for instance. For upgrading the hardware and software of these devices, configuration information such as serial numbers, engineering change numbers, supported protocols, etc., must be available to the network engineer. This configuration management information should also be updated "on the fly". Managing access rights and committed quality of service are also part of configuration management.

Security management deals with detection of unauthorized attempts to access restricted parts of the network or protected computers. It also involves managing firewalls, enforcing security on dialup lines, etc.

Performance management involves congestion avoidance, capacity planning, and bandwidth statistics. More particularly, its role is to make sure that the network capacity is adequate with regard to the needs.

Accounting management consists in tracking the use of the network resources by the different users or groups of users. The purpose may be to bill each one according to his resource utilization, making sure that no one exceeds the resources he has reserved or paid for, or to simply ensure fairness of usage. The accounting management function provides the financial data for capacity planning.

Acquisition of information is essential for an efficient network management system. However, networks are generally made up of disparate devices and the information which can be obtained is more often heterogeneous. The purpose of network management protocols such as CMIP (Common Management Information Protocol) or SNMP (Simple Network Management Protocol) is to standardize sets of queries. For each query of the network manager a particular response is specified. If every node in the network implements the same protocol, then network management becomes hardware independent. This is not always realistic: in practice when faults have to be isolated and fixed, these general purpose protocols are often not sufficient or adequate. For instance both a plane and a car may have a flat tire, but the symptoms, consequences and repair actions are specific to each type of vehicle.

Building a network management system that incorporates all the functions previously described implies the development of a set of software applications or tools and their placement according to a convenient architecture in the communication network. The most commonly used architectures are the following:
1. centralized,
2. distributed,
3. hierarchical.

A centralized architecture implies a network manager in a large central system running the majority of the network management applications.

A distributed architecture consists in multiple peer network managers operating simultaneously, each one being responsible for a part of the network such as a group of countries. A hierarchical architecture is a mix of the two previous: the main central system of the centralized architecture is the root of the hierarchy, accumulating all essential information and allowing access to all parts of the network. Then by setting up peer systems from the distributed architecture, it can delegate some network management tasks that function as children in the hierarchy.

Each one of these approaches involves one or several management consoles at fixed location(s). The recent emergence of Web-based network managers makes mobile management consoles possible. From almost anywhere, with any type of computer, even from a dumb terminal, network engineers can have access to the network, obtain the data they want, and perform preventive and corrective actions.

The World Wide Web, called WWW or more simply the Web, is a set of servers interconnected via a protocol named IP (Internetworking Protocol). The underlying IP network is usually called the Internet. The web protocol, technically termed HTTP (Hypertext Transfer Protocol) has created a historical breakthrough: previously good knowledge of the IP protocol suite was needed to enter the right commands to be able to have access to a server. With HTTP, the user uses a graphical interface called a web browser. By simply clicking with a mouse on one or multiple selection menus called forms, the user is able to get information from a web server. The web browser program performs by itself all the necessary operations for that, i.e., connection to the web server, sending of the request, decoding of the response and display on the graphical interface. On request, a web server may deliver different kinds of data, for example:
1. pages of text in HTML (Hypertext Markup Language) format—the web browser is able to understand the HTML in order to present the text in a convenient way for human user;
2. images or sounds in different kinds of format that the web browser is able to interpret.

The web server is also called HTTPD (HTTP Daemon—in the world of computing a "Daemon" is a program which is able to perform tasks that an "ordinary" program is not allowed to do). A less known HTTPD feature allows the user to request the execution of a program instead of the delivery of a document (a "web page"). In order to perform their job properly, the programs to be executed on the server side have to be written according to some specifications, in particular, according to the CGI (Common Gateway Interface) specifications. The programs written in accordance with these specifications are called CGI programs.

Additional information about network management can be found in the publication entitled "Network Management—a practical perspective" by Allan Leinwand & Karen Fang published by Addison-Wesley Publishing Company, 1993. Additional information about the Web can be found in the IBM publication "Accessing the Internet"—International Technical Support Centers, August 1995, SG24-2597-00. Other sources of information about the Web are online on Web sites. For instance the National Computer Science Application Web site: "http.//hoohoo.ncsa.uiuc.edu" gives detailed information about HTML, HTTP and CGI.

Traditionally, in communication networks, maintenance and troubleshooting functions are performed by using specialized hardware and software platforms. These platforms reside in each node of the communication network and/or in dedicated equipment (the network manager).

In node based maintenance and troubleshooting, the maintenance and troubleshooting of the communication network are made by operating on the faulty network node without having the view of the complete communication network.

An example is the PETC (Product Engineering Tool written in C language). The PETC is used inside communication nodes such as the IBM 2220 Nways Broadband Switch from International Business Machines Corporation (IBM Corp.). The PETC works according to the client/server paradigm:
1. the client part (PETC Client) provides the user interface with a command line accessible through the keyboard of the console;
2. the server part (PETC Server) receives the command from the client and forwards it to the destination resource in the node such as line adapter, switch, etc.

Both are located in a NAS (Node Administration Station) which is a personal computer component of each node. The PETC Server uses the same internal protocol as the NAS to communicate with the line adapters of the node. A remote PETC Client can gain access to a local PETC Server using the TCP/IP protocol.

Another way to manage a network node is to use a combination of:
1. a graphical user interface such as the FEUI (Front End User Interface) in the IBM 2220 Nways Broadband Switch, and
2. a node agent residing in the node.

In fact, in most network architectures, a node agent is present in each network node to handle the CMIP or SNMP protocol for network management purposes. This agent is also used for sending a limited set of commands to the line adapters of the node and receiving the corresponding responses. As previously with the PETC, the destination node agent may also be controlled by a remote FEUI residing in another node using the TCP/IP protocol.

In network based maintenance and troubleshooting, the communication network is managed by the network manager from one or several consoles. Commands are sent to the nodes using a standard protocol such as CMIP (Common Management Information Protocol) or SNMP (Simple Network Management Protocol). Special application programs are developed for each type of network node running under a common program like IBM's Netview network management program providing basic functions such as the user interface, the interface with the operating system, etc.

A recent alternative consists in providing the end user with a web browser like any of those currently used on the public Internet network. Two solutions can be considered:
1. installing a web server inside each node to perform the specific actions requested by the web browser.
2. using a centralized web server to send standard SNMP or CMIP requests to the node to examine (just as traditional network management products would do).

Figure 7:
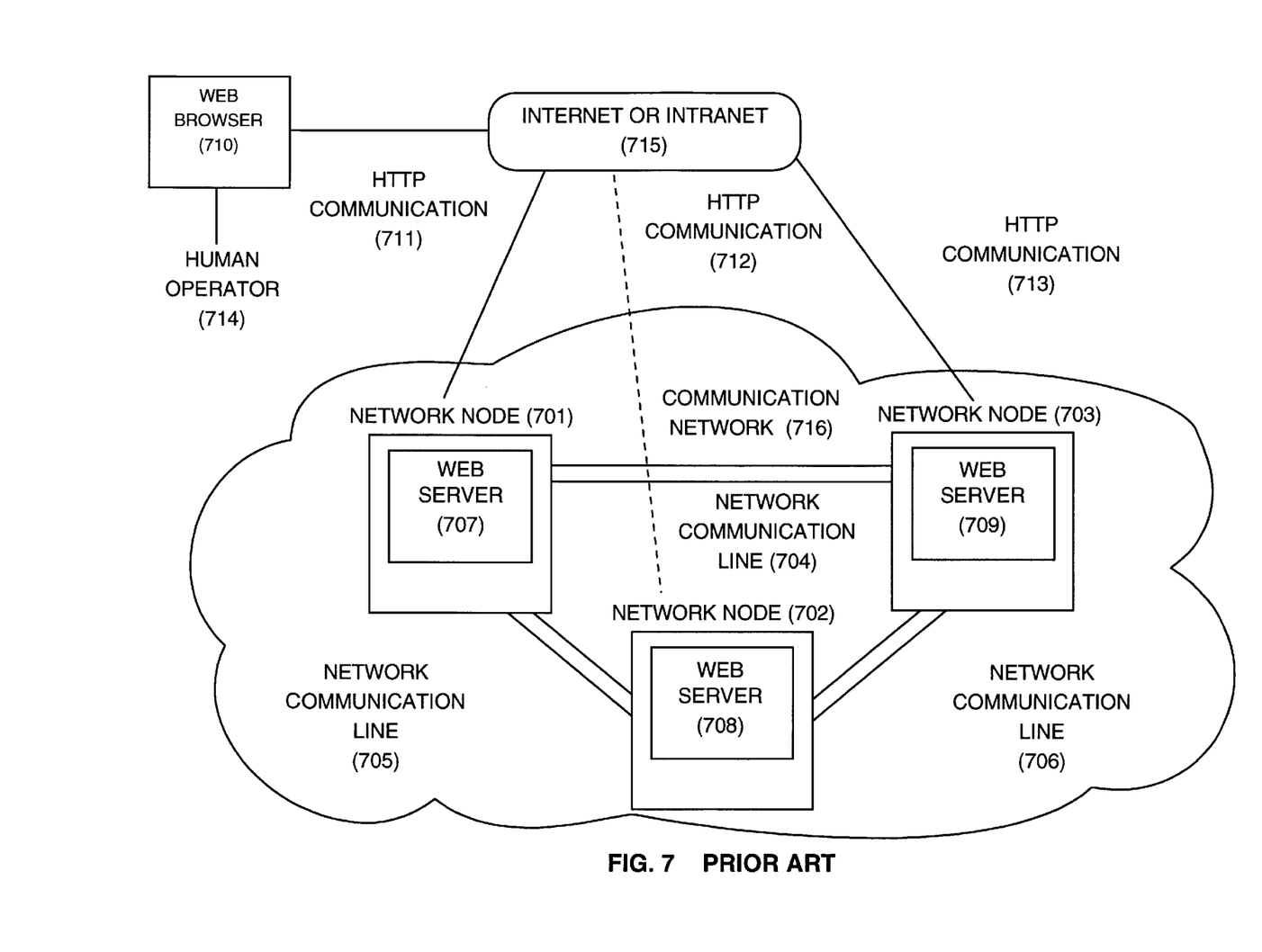
FIG. 7 shows a first example of an existing Web-based network management solution.

A first solution described in FIG. 7, uses a web server on each network node. Due to memory and processing power constraints inside the node, this web server cannot implement all the functions of a real Internet web server and is often located in a ROM. The product "WebManage" from Tribe Computer Works Corporation is an example of such an implementation. FIG. 7 shows three network nodes 701, 702 and 703 communicating together through the communication lines 704, 705 and 706 within the same communication network 716. A web server 707, 708 and 709 is located inside each node. An operator 714 using a web browser 710 has access by means of the public Internet or an Intranet network 715 to any of the web servers by using an HTTP communication 711, 712 or 713.

Figure 8:
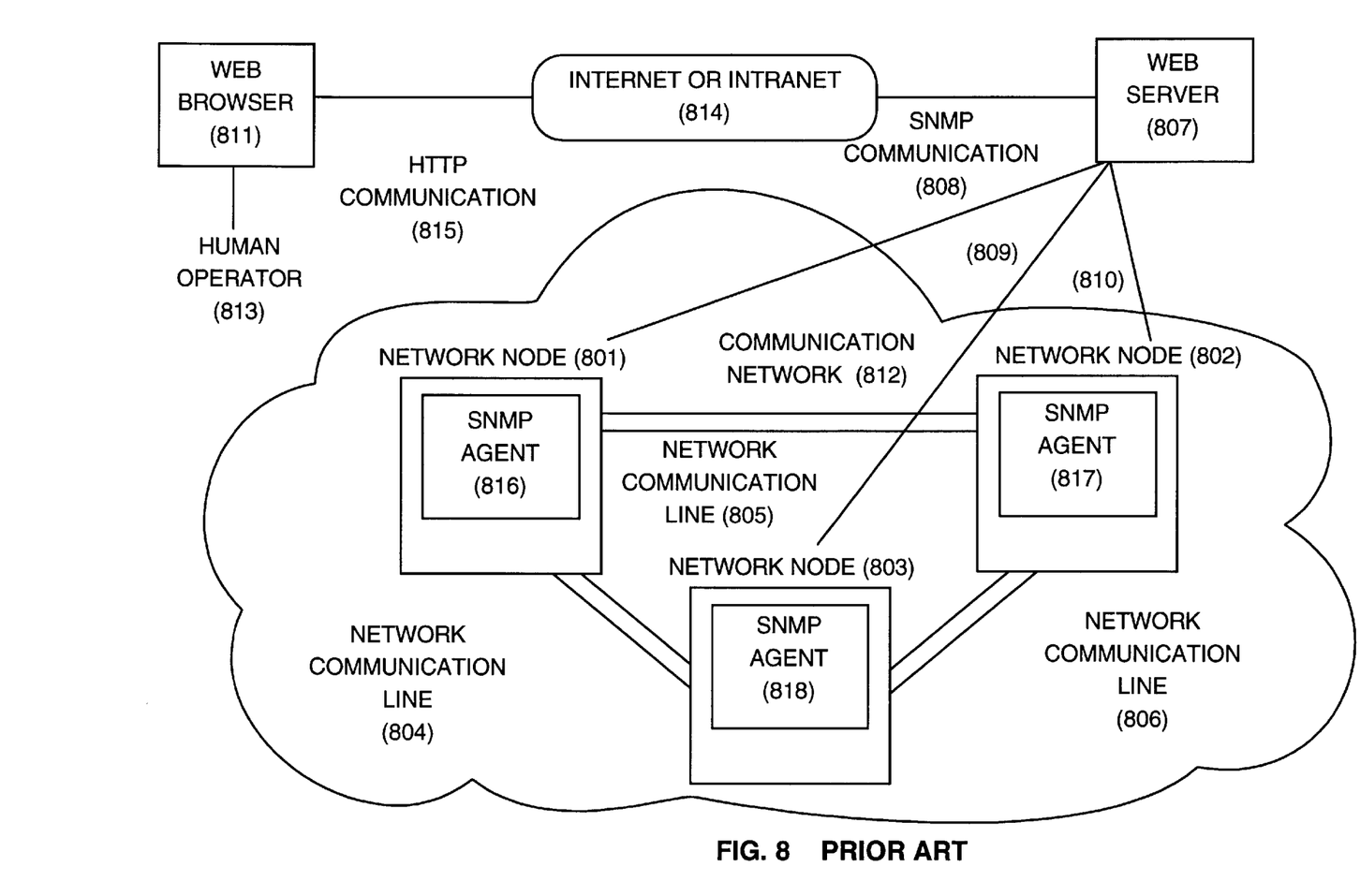
FIG. 8 shows a second example of an existing Web-based network management solution.

A second solution, described in FIG. 8, uses a centralized web server. Three network nodes 801, 802, and 803 communicate together through communication lines 804, 805 and 806 within the same communication network 812. A centralized web server 807 generates SNMP messages towards the network nodes as a classical network manager does. An operator 813 using a web browser 811 can have access to the web server 807. The web browser 811 sends HTTP messages 815 to the web server. These messages are converted to SNMP requests by the web server and forwarded 808, 809 or 810 to the destination node. Messages are then processed by the SNMP agent 816, 817 or 818 of the node.

Network management protocols like SNMP are sufficient to isolate a faulty component such as a hardware card or a piece of software. However, to understand the reason for the failure or to perform repair actions, general purpose protocols are not always adequate. Some communication networks may have special requirements which are not easy to implement in a general purpose product. For instance, in large networks, the network manager is scattered across several computers, each computer managing a sub-network. There is no way to have access to a node from a unique console. For troubleshooting, the network management should be done from any console connected to the network, regardless of its hardware and operating system. Even a dumb terminal should be qualified.

Network equipment manufacturers resort to solutions more or less similar to PETC or FEUI. A specialized solution like the PETC is not user friendly since the user interface is in line mode. This implies that the user has to remember all the available commands with their associated parameters and to enter them via the keyboard. Moreover, the navigation from a network node to another is cumbersome. The navigation is platform dependent and requires proprietary software on the client side to be connected to the server. The server uses the same path as the node agent to communicate with the line adapters and the response time may be long in case of heavy traffic. Furthermore the communication with the adapters is lost in case of a severe problem, at a time when the tool is most needed.

A solution like the FEUI offers only a limited set of functions—the ones provided by the node agent—and the response time may be long when the node agent is heavily loaded, which often occurs in case of node failure. A proprietary software program must be installed on the end user side to remotely operate the user interface.

One could be tempted to install a web server inside each target equipment. This means that the HTTP protocol would replace the specialized protocols like SNMP or CMIP. But HTTP is a protocol built to deliver documents (i.e. text files or images) with a nice and user friendly presentation. Having a program running inside a line adapter of a network node dealing with presentation and languages implies different versions of line adapters according to the supported languages. It also means upgrade of all the network node's hardware if something is changed in the presentation of the results. Delivering a large amount of data such as an image could also seriously impair the overall performance of a line adapter. Moreover, communication network nodes operate in real time and are embedded systems: they have only minimal hardware resources available in terms of memory and computing power. A complete web server requires a large amount of those resources, a "light server" would be useful but since it would not implement the complete protocol, it would not be possible to connect to this "light server" with a standard "off the shelf" web browser. It is probably not reasonable to use the HTTP protocol to perform every network management function for the following reasons:

1. The HTTP protocol is stateless: there is no notion of session, no persistence of objects. From one transaction to the next the web server forgets everything.
2. As the HTTP protocol works in a request/response manner, there is no way to receive unsolicited messages from the network. SNMP traps and CMIP alarms which are essential to fault management rely on unsolicited messages. Continuous polling of the network to track the network node's state changes is ruled out as a solution because it is a waste of bandwidth.

SUMMARY OF THE INVENTION

The system described in this invention called "Network Web Agent" or NWA comprises:

1. A specialized web server using the Common Gateway Interface (CGI) to execute applications. These applications build and send commands to the network nodes, analyze the responses and format them according to the HTML protocol. Applications are triggered in response to a request from a web browser. The response in HTML form is sent back to the web browser. The web server will be referred to below as "Network Web Agent Proxy" or NWAP.
2. Multiprotocol agents which are applications running inside each network node. The multiprotocol agent, referred to below as "Network Web Agent Daemon" or NWAD, receives commands from an NWAP web server and routes them to the appropriate resource inside the node. It then retrieves the response from the node resource and forwards it to NWAP. The NWAD is also able to forward a command to another network node if the node on which it is running is not the final destination node of the command. The NWAD can also execute by itself some commands like a file transfer using a FTP (File Transfer Protocol).
3. Messages exchanged between the web server NWAP and the multiprotocol agent's NWADs. These messages are exchanged using a TCP/IP connection. Each message contains a header to be routed by the NWADs towards the right resource inside the communication network.

DESCRIPTION OF THE PREFERRED EMBODIMENT

The following description and the associated figures detail only one example of the environment in which the invention can be used. In particular, the normalized protocols such as SNMP, CMIP, TCP/IP, the nature of the network nodes and the different types of resources inside, which will be mentioned later on, are by no means restrictive of the scope of the architecture and mechanisms, or objects of this invention. From the teaching of the present description, the person skilled in the art will be able to implement the invention in different environments.

General Structure

Figure 1:
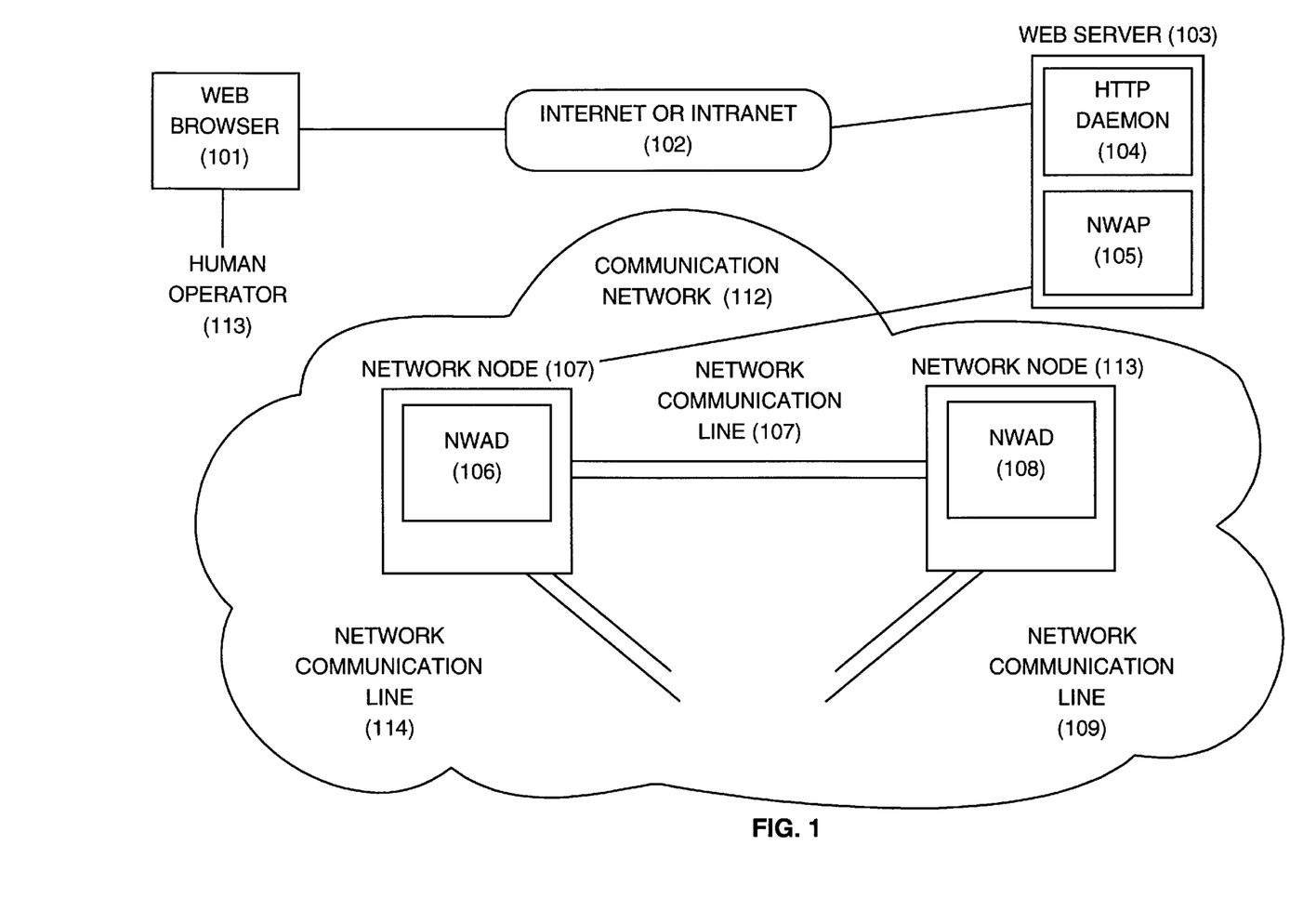
FIG. 1 shows a general view of the network management system according to the present invention.

As described in FIG. 1, the maintenance and management system according to the present invention comprises:

1. a set of procedures 105 inside a web server 103. The web server also comprises an HTTP Daemon 104 responsible for handling the HTTP communications between the web browser 101 and the web server 103.
2. a multiprotocol agent 106, 108, 110 running inside each node 107, 111, 113.
3. a communication protocol between the web server 103 and the multiprotocol agent 106, 108, 110 within each node 107, 111, 113.

Network Web Agent Proxy

A set of procedures 105, named NWAP (Network Web Agent Proxy) operates inside a web server 103. The NWAP 105 is activated from a web browser 101. This web browser is able to communicate with the web server through the Internet or an Intranet communication network 102. The web browser 101 is connected to the NWAP 105 using the standard Common Gateway Interface (CGI) of the web server 103. The NWAP 105 is able to:

1. send commands to a remote multiprotocol agent NWAD 106 (Network Web Agent Daemon),
2. decode the responses, and
3. build HTML pages to display on the web browser.

Locating the web server outside network nodes avoids the drawbacks described earlier, i.e., lack of resources, platform dependence, and data presentation merged with operational functions.

Network Web Agent Daemon

A multiprotocol agent NWAD 106, 108, 110 operates inside each node 107, 113, 111 of the communication network 112 to manage. Such multiprotocol agent NWAD is able to:

1. receive commands from the Web Server NWAP 105,
2. translate them into the right protocol in order that they may be understood by the target resource inside the node—the target resource may be a network management (SNMP or CMIP) node agent, a node configuration manager, a node error log, a line adapter, etc.

The multiprotocol agent NWAD has also the capability to execute general purpose commands by itself like a file transfer or to run successive commands under the control of the web server. It also has knowledge of the location of the network nodes (for instance, it has the capability to query the general directory of the network). Thus, an NWAD such as 106 can forward commands to the appropriate node 111 or 113 through the communication network 112 if the node 107 where it resides is not the final destination node 111, but only an intermediate node. The NWAD introduces flexibility in the sense that the same action can be performed in different ways. For instance, a line adapter may be activated via a single command from the NWAD to the CMIP node agent, or by means of a succession of commands directed from the NWAD to the line adapter. These alternate paths are very useful for performing troubleshooting. Moreover a very large set of commands is available, extending the standard CMIP and SNMP commands. The use of proprietary commands speeds up the response time since the complete CMIP or SNMP protocol is bypassed.

Network Web Agent Communication Protocol

Figure 2:
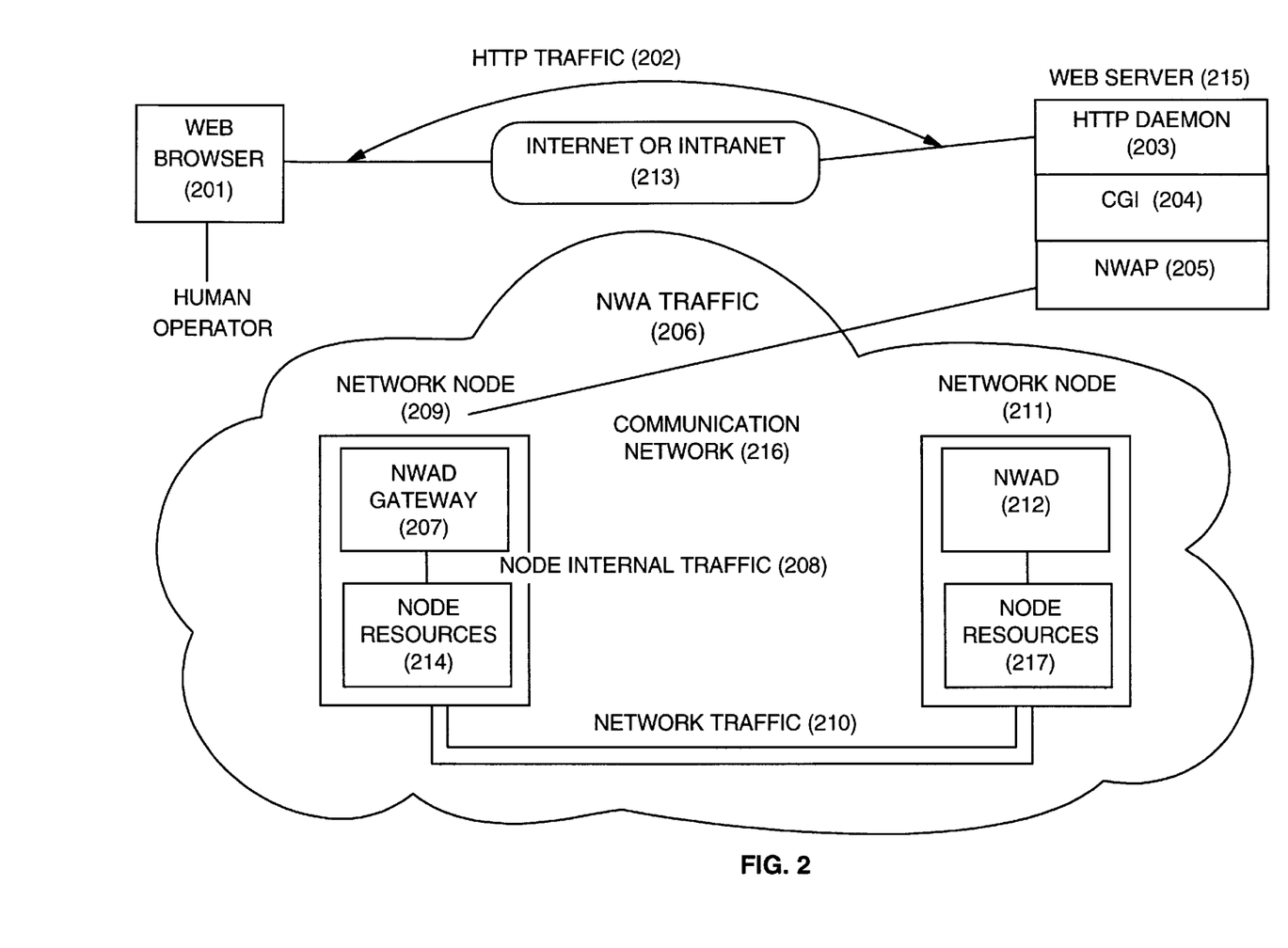
FIG. 2 shows the communication between the various elements of the network management system according to the present invention and the network nodes.
Figure 4A:
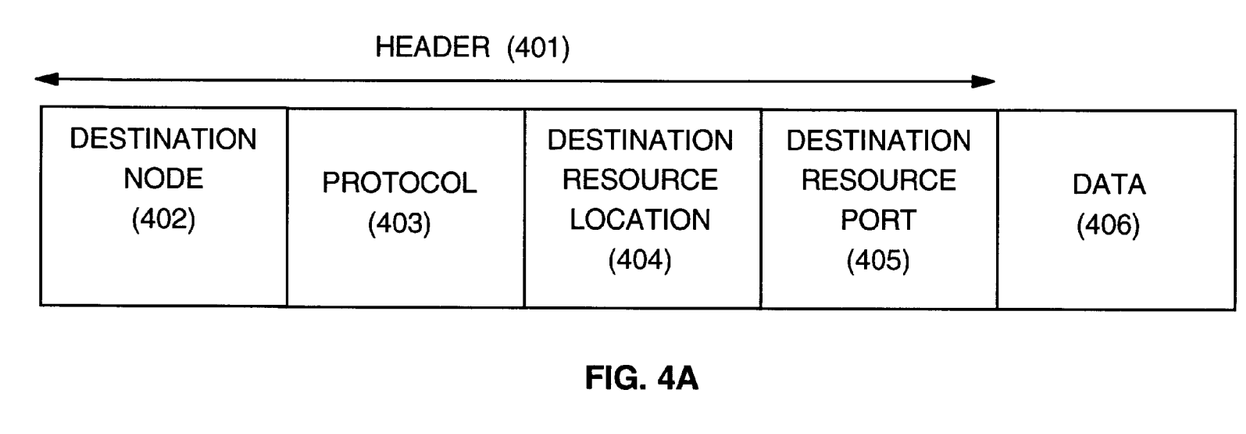
FIG. 4A shows the format of a command from the web server NWAP to a multiprotocol agent NWAD within a network node.

The Network Web Agent Proxy NWAP and the multiprotocol agent NWAD communicate by means of a simple and reliable communication protocol. As illustrated in FIG. 2, requests from the web browser 201 to the HTTP Daemon 203 of a web server 215 and the corresponding responses are transmitted using the standard HTTP protocol 202 through an Internet or Intranet communication. The NWAP procedures 205 are activated from the web server 203 by means of the Common Gateway Interface (CGI) 204. The NWAP is then able to issue requests to the multiprotocol agent NWAD using a specific Network Web Agent Communication Protocol 206. This protocol consists of independent transactions in a client-server mode, NWAP being the client and NWAD the server. A transaction includes the following:

1. The NWAP 205 makes a request to the NWAD 207 of the destination node 209 to establish a TCP/IP connection.
2. The NWAP 205 sends on the connection a command comprising a header part with routing information for the NWAD 212 and a data part for the target node resource 217. The format of this command is shown in FIG. 4A and will be detailed later.
3. A response is sent back from the NWAD to the NWAP 205 on the same TCP/IP connection with a format described in FIG. 4B.
4. Then, the connection is closed. This ensures that a failing transaction will not hinder further access to the node.

An entry point 207 called "NWAD Gateway" may be defined in the communication network. Its function is to route the requests to distant nodes such as node 211 through the normal node resources 214 and with the normal network traffic 210. The NWAD Gateway gets the destination network node TCP/IP address from the directory services component of the access node 209. The command from NWAP 205 may then be sent by NWAD gateway 207 to the destination NWAD 212 as a standard TCP/IP message.

General Flow

Figure 3:
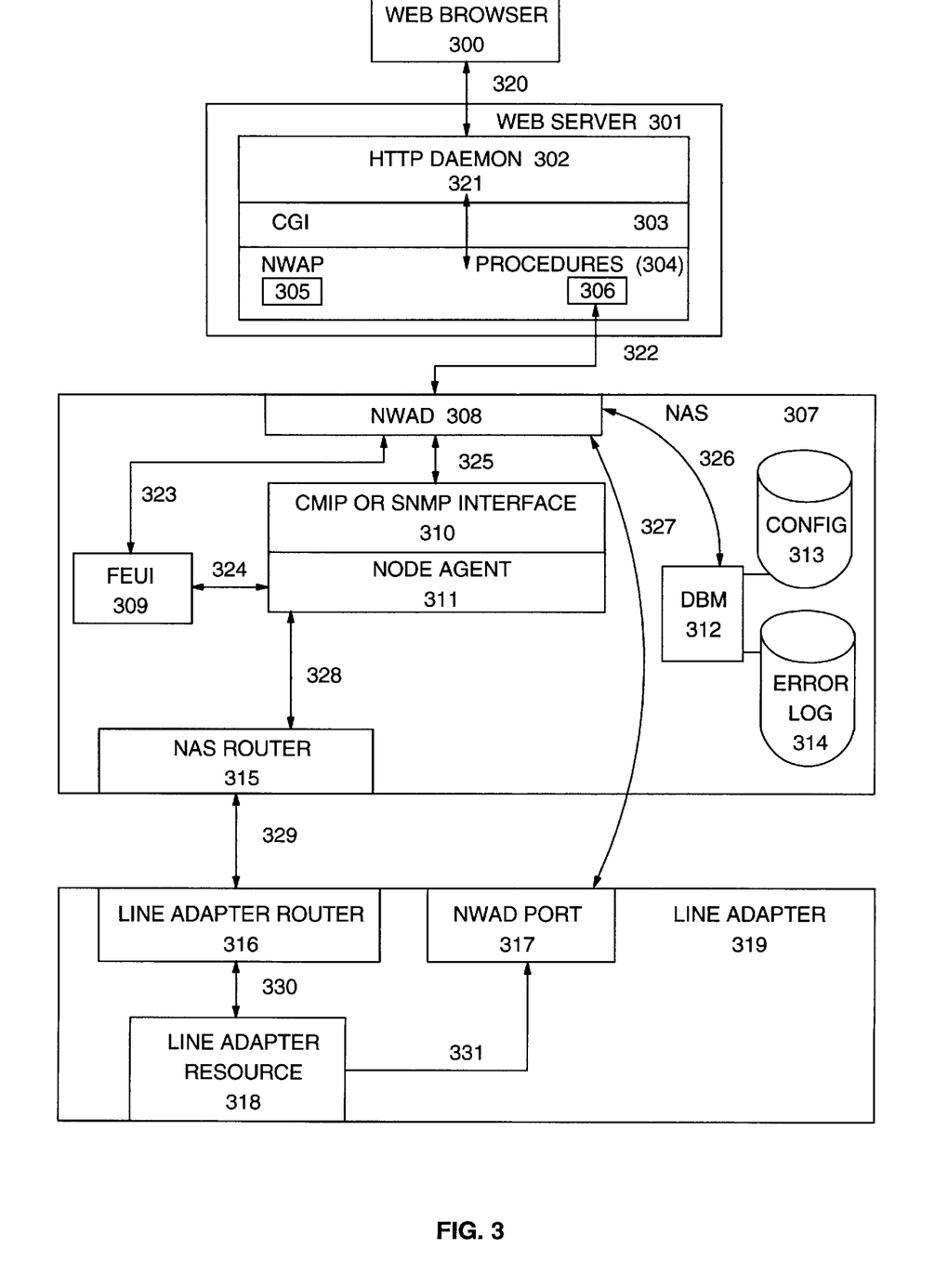
FIG. 3 shows a flow chart describing a network node according to the present invention.

FIG. 3 shows the relationships between the different agents of the network management system and the components of the network node according to the present invention.

Web Browser and Web Server

First, the web browser 300 sends an HTTP message to the web server 301. The message is generated by a human operator clicking on a hyperlink of a web browser page with a mouse as explained previously. The message is received by the "HTTP Daemon" 302 part of the web server which is in charge of the exchange of the HTTP messages between the web server and the web browser. This message triggers a NWAP software program 305 thanks to the CGI interface 303 according to a mechanism which is well known by a person skilled in the art. This first request could be to get a screen menu. Such screen menu is dynamically built in the web server 301 by the software program responsible for that task 305 using HTML tags and forms. The requested screen menu is returned to the web browser 300 using the reverse path. A more detailed explanation of the NWAP structure will be given later on. By clicking on the proper field on the received menu, the user at the web browser 300 is able to send a second command to the web server 301 for performing an action on a particular network node called "destination node". Such an action could be for instance:

1. activating or deactivating a line adapter,
2. retrieving the node error log,
3. reconfiguring a line adapter,
4. retrieving traffic statistics on a line,
5. performing an extended test of the node.

At the reception of this second command, the HTTP Daemon 302 activates a second procedure 306 for building a command 322 intended for the multiprotocol agent NWAD 308 running in the network administrative station (NAS) 307 of the target node. This command may be sent using a TCP/IP connection.

Web Server and NWAD

The fact that the NWAD 308 is running on the NAS 307 is not essential for the present invention and must be considered as a preferred embodiment. Another environment can be imagined where the NWAD is running on a specialized line adapter. The NAS (network administrative station) attached to each node is a personal computer. Its function is to:
1. host the SNMP or CMIP agent of the network node,
2. store a node configuration data base and an error log,
3. have access to the different resources within the node, and
4. provide a human user interface.

The NAS is able to communicate with the line adapters inside the network node (for instance using TCP/IP connections over an Ethernet Local Area Network (Ethernet LAN). The format of the commands 322 transmitted from the web server 301 to the multiprotocol agent NWAD 308 located in the node is detailed in FIG. 4A. The commands comprise a header 401 and a data field 406:

The "header" 401 contains information used by the multiprotocol agent NWAD 308 to route the command to the destination node and to select the right resource inside.

The "destination node" field 402 contains the name of the node on which the specific action has to be performed.

The "protocol" field 403 indicates the type of protocol the multiprotocol agent NWAD 308 must use to dialog with the resource within the node. This field will be described below.

The "destination resource location" field 404 indicates which resource is designated. For instance it may be a component of the network administrative station (NAS) or a line adapter. The "destination resource port" field 405 indicates on which TCP/IP port a connection from the NWAD to the destination resource must be established.

The "data" field 406 contains the command itself in the format the resource is accustomed to receive commands from other components within the node.

Figure 4B:
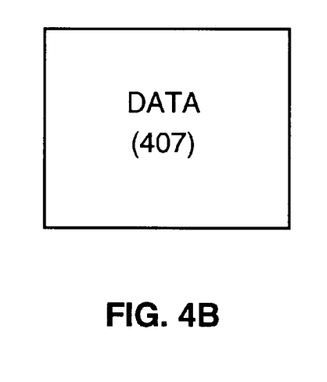
FIG. 4B shows the format of a response from the multiprotocol agent NWAD to the web server NWAP.

The format of the response forwarded by the NWAD 308 to the web server 301 as shown in FIG. 4B is very simple because it comprises only a data field 407. This data field is the response of the node resource. In fact, since the response flows on the same connection as the request and since the NWAD handles only one command at the same time (as will be explained below with respect to FIG. 5B), there is no need for additional fields as for the command.

NWAD and Node Resource

Because of the information contained in the command header, the multiprotocol agent NWAD can, by means of a mechanism that will be detailed below, forward the request to the designated resource inside the node.

NWAD and FEUI

For instance a command 323 may be sent to the Front End User Interface (FEUI) 309. The FEUI handles the requests coming from the operator working on the NAS. The format of the command, let's say "activate adapter 3" and the way the FEUI receives it are exactly the same as if a human user had clicked on "adapter 3" on the NAS panel and had selected the activate action. As usual, the FEUI forwards the command 324 to the CMIP or SNMP node agent 311, which sends it to the NAS router 315 through appropriate means such as a queuing mechanism. The NAS router 315 then dispatches the command 329 to the target line adapter 319 using for instance a TCP/IP connection on the Ethernet link between the NAS 307 and the line adapter 319.

After it has been routed by a line adapter router 316, the command 330 will finally be received by the destination line adapter resource 318 inside the line adapter 319. The resource 318 processes the request as if it was originated from the FEUI and sends the response using the reverse path. When the NWAP procedure 306 receives the response, it decodes it, builds an HTML page and sends this page to the web server. This marks the end of this transaction.

NWAD and Node Error Log

Another type of transaction is to retrieve the error log 314 from the node. This error log 314 is stored in a data base inside the NAS 307. The NWAP program 306 prepares a command for the multiprotocol agent NWAD. The data part contains a command 326 for the data base manager (DBM) 312 for extracting error records. This command 326 is sent to the data base manager 312 in a format such as the SQL format (Search and Query Language).

NWAD and Node Configuration

For changing the content of the configuration data base 313 within the node, the data base manager 312 uses an "update data base" request.

NWAD and CMIP/SNMP Reports

The human operator at the web browser 300 can also request an SNMP or CMIP report. In that case, the NWAP procedure 306 prepares a command for the multiprotocol agent NWAD 308 with a data part in form of an SNMP or CMIP request. This request is sent by the NWAD 308 to the CMIP or SNMP interface 310 of the node using a TCP/IP connection 325.

NWAD and Line Adapters

For specific purposes such as network troubleshooting, some additional commands which are not part of the set of commands the node agent 311 is able to transmit, may be sent to the line adapters. A direct communication from the NWAD 308 to the line adapter 319 is then established using TCP/IP. For this purpose, an NWAD port program 317 runs inside the line adapter 319 waiting for a command 327 on the TCP/IP port. When the command is received, it is then forwarded to the destination line adapter resource 318 inside the line adapter 319.

Node Web Agent Daemon

Figure 5A:
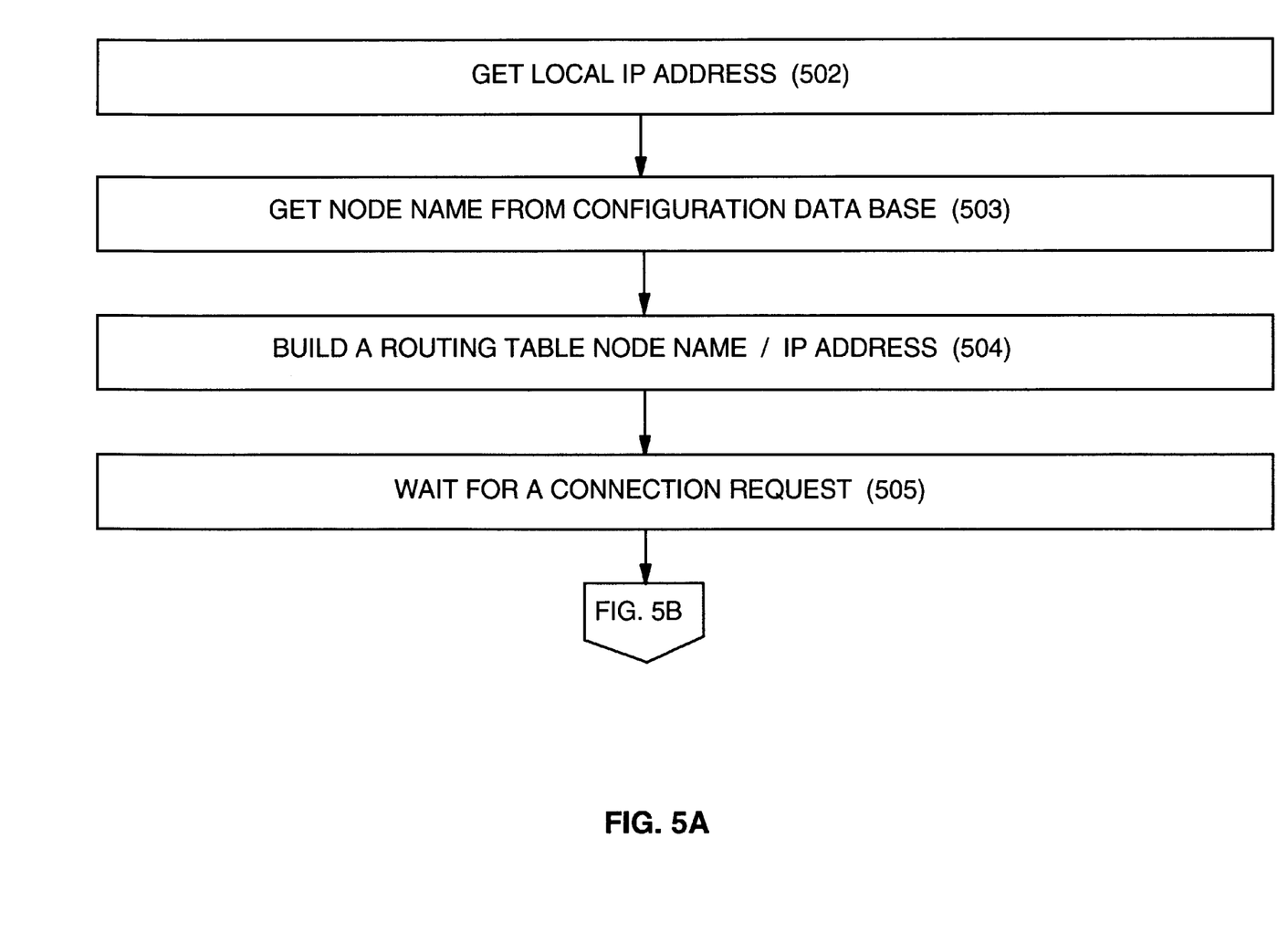
FIG. 5A shows the sequence of operations performed inside a multiprotocol agent NWAD when it goes through its initialization phase.
Figure 5B:
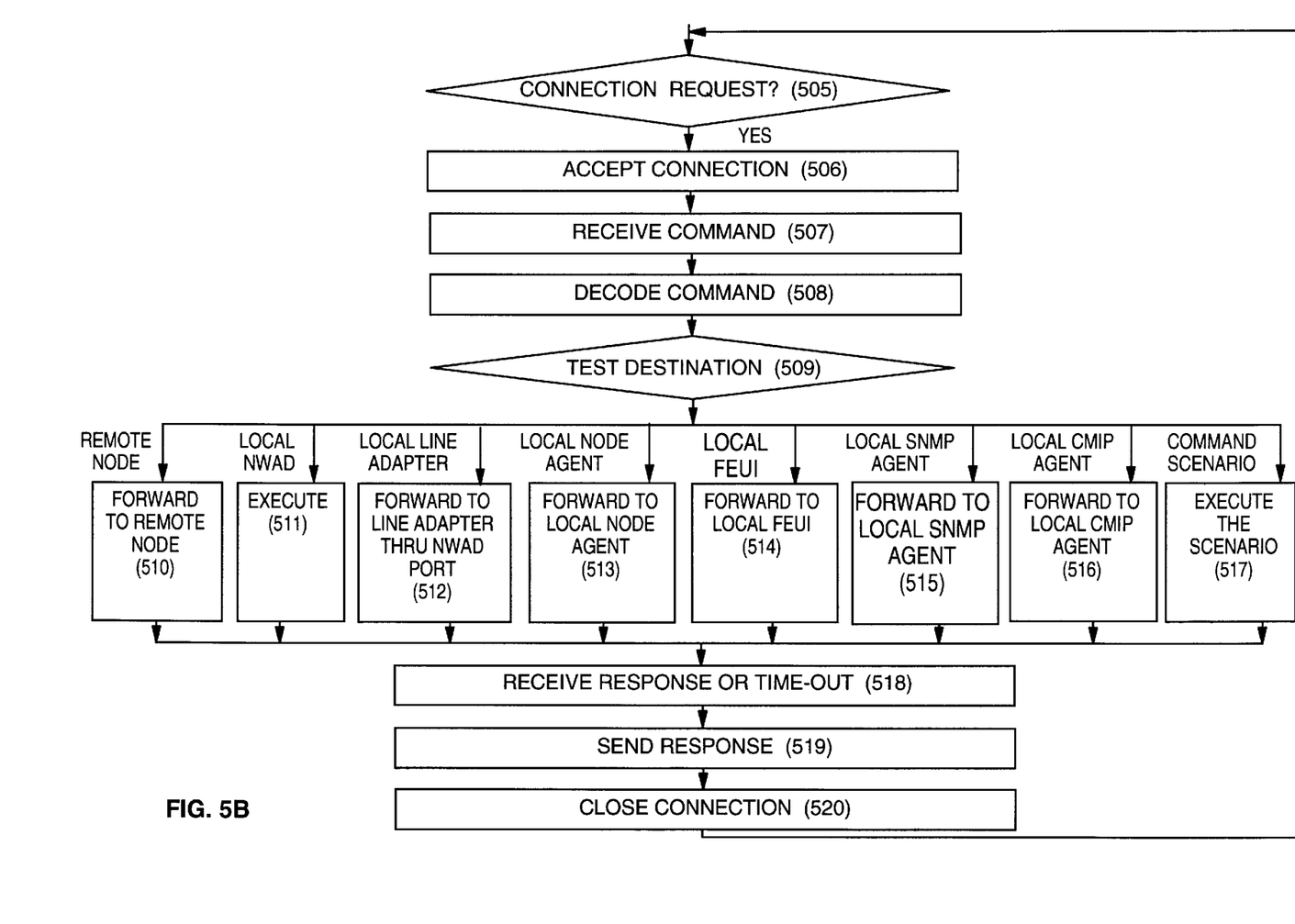
FIG. 5B shows the sequence of operations performed inside a multiprotocol agent NWAD when it has entered its operational phase.

FIGS. 5A and 5B are flow charts describing the operating mode of the mutiprotocol agent NWAD. The NWAD first performs an initialization sequence as shown in FIG. 5A and then is placed in an operational mode as shown in FIG. 5B.

Initial Phase

As illustrated in FIG. 5A, during its initial phase the NWAD performs the following:

Step 502: retrieves the NAS IP address on which it is running by requesting said address to the NAS TCP/IP layer.

Step 503: determines the name of the node on which it is running by consulting the node configuration data base.

Step 504: builds an internal routing table associating the names of the network nodes with their IP address. For that purpose the NWAD uses the Directory Services of the network (located inside each node). This routing table allows routing of the commands 401 according to the destination node field 402 after conversion to the node IP address.

The availability of this routing table under control of the NWAD is not mandatory but improves performance since this information does not have to be requested for each new command.

Step 505: waits for a connection request from the web server or from another NWAD.

Operational Phase

As illustrated in FIG. 5B, after the previously described initial phase, the NWAD is placed in an infinite loop waiting for a connection request from the web server.

Step 506: When the NWAD receives a connection request from the web server or from another NWAD, it accepts the request, and waits for a command.

Steps 507/508: When the NWAD receives a complete command (Step 507), it decodes it (Step 508) according to the format detailed in FIG. 4A.

Step 509: The NWAD checks the destination by testing the destination node 402 field. The NWAD determines if the command is for the node where it resides or not.

Step 510: If the command is not for the node where the NWAD resides, a connection is established with the destination node using the NWAD routing table. The command is sent to this destination node.

Step 511: If the command is for the node where the NWAD resides, the protocol field 403 of the command is checked. If the protocol indicates that the command is for the NWAD, the command is executed. A command for the NWAD may be for instance a file transfer on the NAS local disk or a standard TCP "ping" command towards a line adapter to see if it is alive (Note: on an Internet or Intranet network, "ping" is the easiest command to test if it is possible to communicate with anyone else on the network).

Step 512: If the command is local and the protocol field 403 indicates that the command is for a line adapter, the destination resource location field 404 gives the position of this line adapter within the node. The port number indicated in the destination resource port field 405 allows the NWAD to start a TCP/IP communication and to send the command to the NWAD port component 317 of this line adapter.

Step 513: If the destination is the local node and the protocol field 403 indicates that the command is directed to the node agent, a TCP/IP connection is established between the NWAD and the node agent and the command is forwarded to the node agent within the NAS.

Steps 514, 515, 516: The process is the same for the local FEUI, the local SNMP or the local CMIP agent.

Step 517: The protocol field 403 may also indicate that the NWAD must execute a sequence of commands called scenario. In that case, the data field 406 of the command contains this scenario which is a program prepared by the web server and directly executable by the multiprotocol agent NWAD. This may be used for instance to perform a complex set of accesses to one of the NAS data bases. The advantage is that the scenario is executed locally instead of requiring multiple data exchanges between the web server and NWAD.

Step 518: After transmission of the command, the NWAD starts a timer and waits for a response from the destination resource.

Step 519: The response is sent back to the web server or to the NWAD which has transmitted the command using the same TCP/IP connection as for the command.

Step 520: The connection is closed and the NWAD is ready to accept a new connection request.

NWAD works according to the Web concepts: to each new command there corresponds a new connection. This connection is used to send one command and get the corresponding response. This concept has been extended to the private communication between the NWAP server and NWAD, and between NWAD and the line adapter resources. This mode of operation is done for reliability purpose which is essential for an efficient remote maintenance system. If something goes wrong with one command, a new connection is opened and the current one is aborted.

Network Web Agent Proxy

Figure 6:
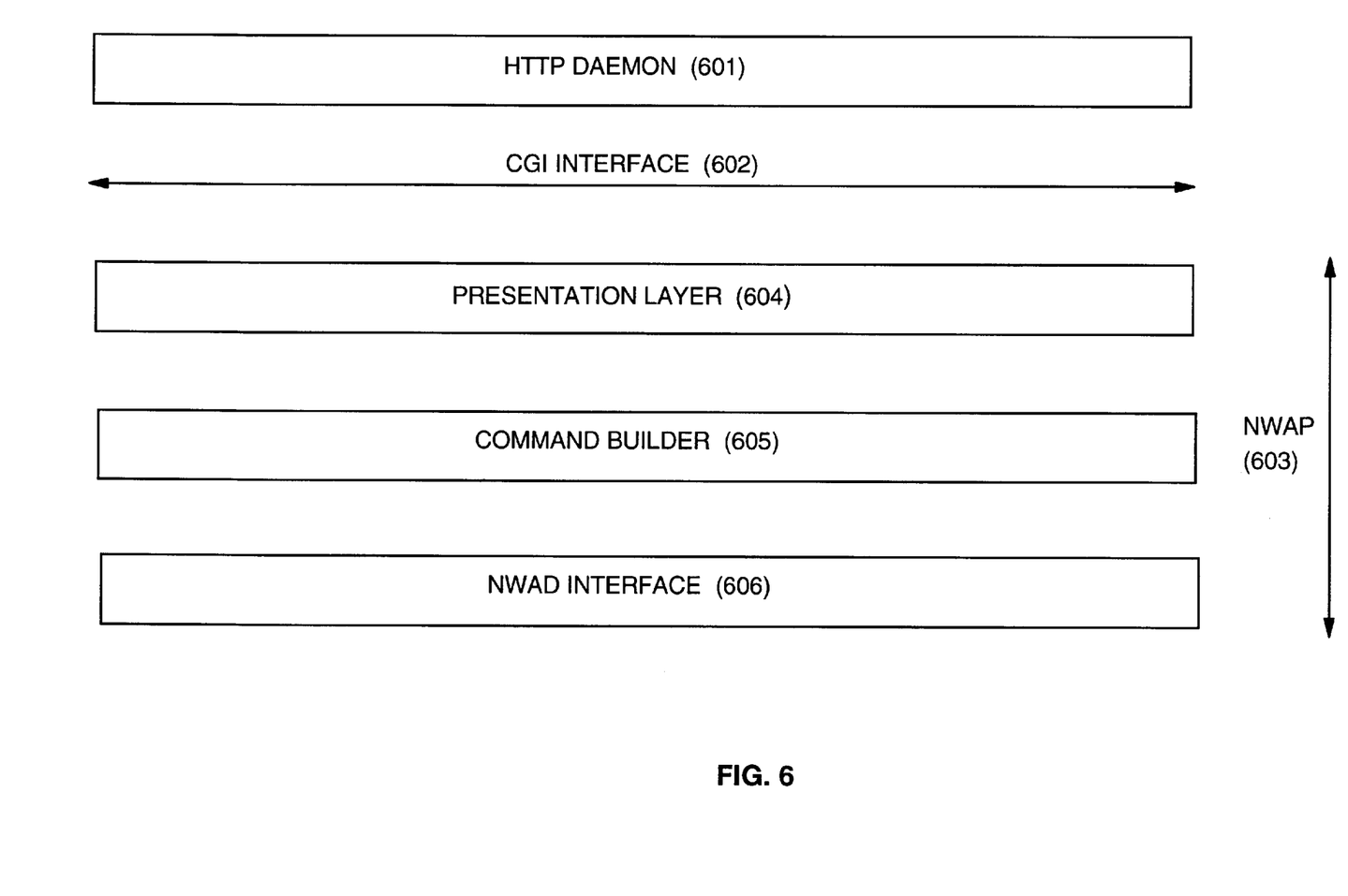
FIG. 6 shows the layer structure of Network Web Agent Proxy NWAP.

The layer structure of Network Web Agent Proxy (NWAP) is illustrated in FIG. 6 and described below.

HTTP Daemon

The HTTP Daemon 601 receives the HTTP requests from the web browser. For instance such a request could be:

"http://nwaserv/cgi-bin/
LineAdapterMenu.cmd?Nodename"

where:
"http" is the protocol used to communicate between the web browser and the web server;
"nwaserv" is the name of the web server;
"cgi-bin" is the directory on the web server where the CGI programs are located;
"LineAdapterMenu.cmd" is the name of the file containing the NWAP program to execute;
"Nodename" is an input parameter for this program.

Presentation Layer

The presentation layer 604 of the NWAP is in charge of building menus. This is done using HTML tags, hyperlinks to other menus and forms for the user for selecting an action. The web request generated by the web browser after the selection of an action by the human user is of the type:

"http://nwaserv/cgi-bin/
LineAdapterCommand.cmd?NodeName+
AdapterNumber".

Upon reception of this request, the web server starts the program "LineAdapterCommand" in the cgi-bin directory with the parameters "NodeName" and "AdapterNumber". If additional parameters such as the command identifier selected by the user in the HTML form are needed, the CGI interface 602 sets the environment variables of the web server according to their value. The program "LineAdapterCommand" can then retrieve them to build the data field of the command according to FIG. 4.

Command Builder

The "LineAdapterCommand.cmd" program is contained in the command builder component 605 of the NWAP. Said command builder is in charge of preparing the data field 406 of the NWAP/NWAD command. The command builder 605 then calls the NWAD interface component 606 of the NWAP to establish a TCP/IP connection with NWAD and send the command over it.

NWAD Interface

The NWAD interface 606 is responsible for physically sending commands. The transmission is done by means of a TCP/IP connection. The NWAD Interface 606:
1. establishes the connection with NWAD,
2. sends the data, and
3. waits indefinitely for a response.

When the response is received, the command builder 605 analyzes it, prepares an HTML page with the response formatted in a convenient way for a human user to interpret it easily and forwards it to the CGI interface 602. The CGI interface 602 gives it to the HTTP Daemon 601 of the web server which transmits it to the web browser.

In summary, the present invention has the following advantages:

1. The present network maintenance and management system does not depend on a specific software or hardware platform as traditional solutions do. Web browsers and web servers are commercially available for virtually any existing platform.
2. The user interface (web browser) is user friendly and quite universal.
3. The system is fault tolerant since it is based on independent transactions.
4. The system has only a minor impact or no impact at all on the embedded code running inside the node resources, since all of the process is done inside the web server.
5. Any command can be sent to the node resources, since there is no "filtering" (by a CMIP or SNMP agent, for instance).

6. The multiprotocol agent NWAD is able to connect to different kinds of interfaces and thus offers a great flexibility to the system.
7. The system offers a quick response time since it avoids going through the SNMP or CMIP stack which corresponds to thousands of lines of code. Due to the capability of the NWAD to perform scenarios, it also allows the execution of a sequence of commands locally inside the node instead of sequencing them from the web server.
8. The system uses the communication network to reach the nodes instead of specialized lines.

While the invention has been particularly shown and described with reference to the particular embodiments thereof, it will be understood by those skilled in the art that various changes in form and detail may be made therein without departing from the spirit and scope of the invention.

What we claim is:

1. A maintenance and management system for a remote node in a communication network having a plurality of nodes interconnected with communication lines, each node having at least one resource, said system comprising:
    a web server including:
        a network web agent proxy for sending a command to a destination resource in any destination node of a communication network, said command including an identification of the destination resource and at least one request;
    a multiprotocol agent attached to each node including:
        a receiver module for receiving a command from the web server;
        a conversion module for converting the at least one request included in said command in a protocol understandable by the destination resource within the node;
        a transmitter module for transmitting said converted at least one request to the destination resource.

2. The maintenance and management system for a remote node according to claim 1 wherein said multiprotocol agent in each node further comprises:
    a receiver module for receiving the command from another multiprotocol agent in another node wherein said command includes an identification of the destination node;
    a network web agent daemon gateway for routing the command to a multiprotocol agent in the destination node containing the destination resource or to a multiprotocol agent in a neigh boring node along the path to the destination node containing the destination resource.

3. The maintenance and management system for a remote node according to claim 2 wherein each command sent by the web server to the multiprotocol agent comprises:
    a data field including at least one request; and
    a header field for routing said at least one request to the destination resource.

4. The maintenance and management system for a remote node according to claim 3 wherein said header field comprises:
    a destination node identifier for routing the command from the web server to the destination node;
    a protocol identifier for adapting the at least one request transmitted in the data field in a protocol understandable by the destination resource;
    a destination resource identifier for routing said at least one request transmitted in the data field to the destination resource within the node;
    a destination resource port address for establishing a TCP/IP connection between the multiprotocol agent and the line adapter inside the node containing the destination resource.

5. The maintenance and management system for a remote node according to claim 1 wherein said multiprotocol agent in each node further comprises:
    a transmitter module for transmitting a response from the destination resource to the web server or to a neighboring node along the path to the web server.

6. The maintenance and management system for a remote node according to claim 5 wherein:
    for each command sent by the web server a new connection is established;
    the response associated with said command is returned to the web server using the new connection;
    said new connection is closed after the response has been transmitted to the web server.

7. The maintenance and management system for a remote node according to claim 6 wherein said commands and responses exchanged between the web server and the multiprotocol agents are transmitted over TCP/IP connections.

8. The maintenance and management system for a remote node according to claim 6 wherein commands from the web server and responses from the destination resources are transmitted through the network lines and network nodes.

9. The maintenance and management system for a remote node according to claim 1 wherein said web server receives requests and sends responses, in particular HTML pages, to at least one web browser through an internet or intranet network.

10. The maintenance and management system for a remote node according to claim 1 wherein said destination resource is a multiprotocol agent.

11. The maintenance and management system for a remote node according to claim 1 wherein said destination resource is a line adapter.

12. The maintenance and management system for a remote node according to claim 1 wherein said destination resource is an error log.

13. The maintenance and management system for a remote node according to claim 1 wherein said destination resource is a configuration data base.

14. The maintenance and management system for a remote node according to claim 1 wherein said destination resource is a CMIP or SNMP interface.

15. The maintenance and management system for a remote node according to claim 1 wherein said destination resource is a front end user interface.

16. A maintenance and management method for a remote node in communication network having a plurality of nodes interconnected with communication lines, each node having at least one resource, said method comprising the steps of:
    sending a command from a web server to a destination resource in any destination node of a communication network, said command including an identification of the destination resource and at least one request;
    receiving a command from the web server at a multiprotocol agent attached to each node;
    converting the at least one request included in said command in a protocol understandable by the destination resource within the node; and
    transmitting said converted at least one request to the destination resource.

17. The maintenance and management method for a remote node according to claim 16 further comprising the steps of:

receiving a command from another multiprotocol agent in another node wherein said command includes an identification of the destination node; and routing the command to a multiprotocol agent in the destination node containing the destination resource or to a multiprotocol agent in a neigh boring node along the path to the destination node containing the destination resource.

18. The maintenance and management method for remote node according to claim 17 wherein each command sent by the web server to the multiprotocol agent comprises:

a data field including at least one request; and a header field for routing said at least one request to the destination resource.

19. The maintenance and management method for a remote node according to claim 18 wherein said header field comprises:

a destination node identifier for routing the command from the web server to the destination node;

a protocol identifier for adapting the at least one request transmitted in the data field in a protocol understandable by the destination resource;

a destination resource identifier for routing said at least one request transmitted in the data field to the destination resource within the node; and a destination resource port address for establishing a TCP/IP connection between the multiprotocol agent and the line adapter inside the node containing the destination resource.

20. The maintenance and management method for a remote node according to claim 16 further comprising:

transmitting a response from the destination resource to the web server or to a neigh boring node along the path to the web server.

21. The maintenance and management method for a remote node according to claim 20 including the steps of:

establishing a new connection for each command sent by the web server;

transmitting a response associated with said command to the web server using the new connection; and closing said new connection after the response has been transmitted to the web server.

22. The maintenance and management method for a remote node according to claim 21 wherein said commands and responses exchanged between the web server and the multiprotocol agents are transmitted over TCP/IP connections.

23. The maintenance and management method for a remote node according to claim 21 wherein commands from the web server and responses from the destination resources are transmitted through the network lines and network nodes.

24. The maintenance and management method for a remote node according to claim 16 wherein said web server receives requests and sends responses, in particular HTML pages, to at least one web browser through an internet or intranet network.

* * * * *